April 16, 1968     R. W. FREDERICKS ETAL     3,378,027
CHEMICAL ADDITIVE SYSTEM
Filed Jan. 25, 1966
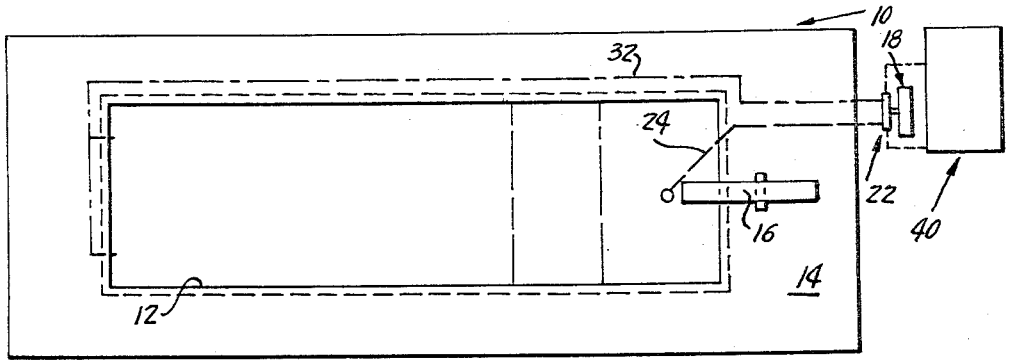
FIG. 1
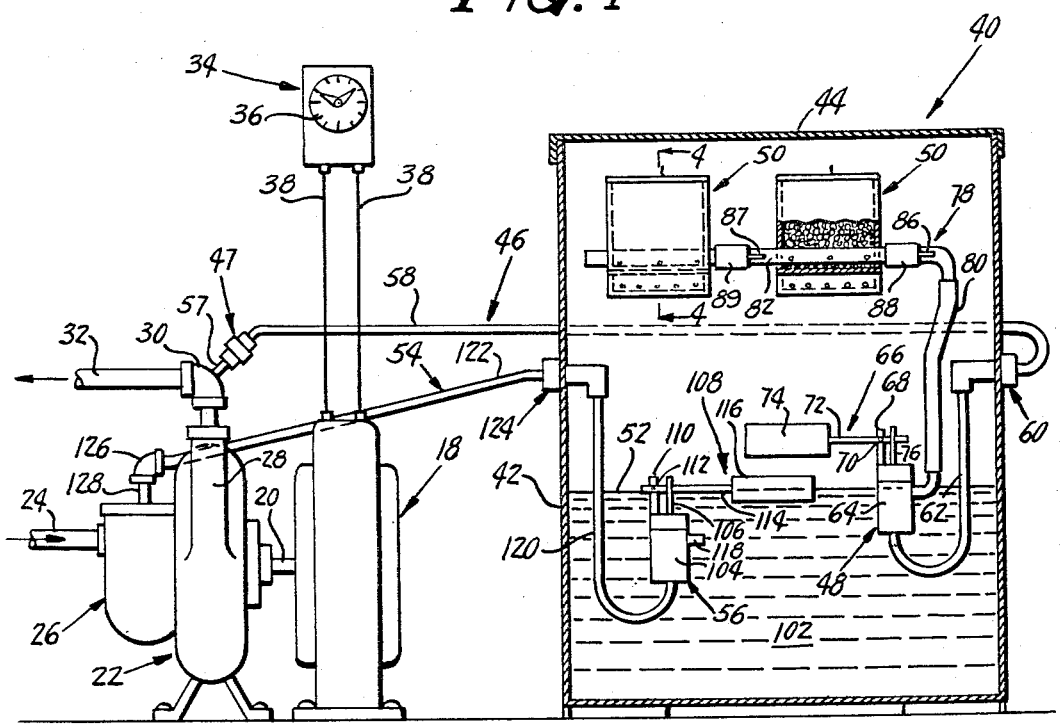
FIG. 2
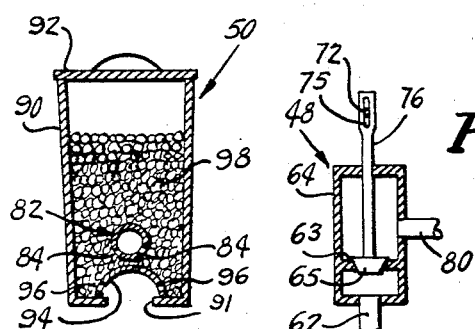
FIG. 3
FIG. 4
INVENTOR.
ROBERT W. FREDERICKS
THEODORE L. HARBAUGH
BY Kimmel, Crowell & Weaver
ATTORNEYS.

3,378,027
CHEMICAL ADDITIVE SYSTEM
Robert W. Fredericks and Theodore L. Harbaugh, South Gate, Calif., assignors to Omco Chemical Corporation, South Gate, Calif., a corporation of California
Filed Jan. 25, 1966, Ser. No. 522,984
9 Claims. (Cl. 137—268)

ABSTRACT OF THE DISCLOSURE

An apparatus for adding chemicals to a liquid circulating system which comprises a receptacle for the liquid and a pump having an inlet and having an outlet communicating with the receptacle to deliver the liquid thereto. A tank located above the level of the receptacle is connected to the pump outlet by a liquid delivery conduit and to the pump inlet by a liquid return conduit, liquid-level-actuated devices in the two conduits maintaining the liquid level in the tank between a predetermined maximum and a predetermined minimum. Chemical containers in the tank above the maximum liquid level are connected to the liquid delivery conduit so that liquid emanating therefrom dissolves the chemicals, the solutions being discharged into the liquid in the tank and being conducted to the receptacle through the liquid return line and the pump.

Background of invention

This invention relates to a chemical additive system, and more particularly to a device for adding chemicals to a liquid system such as a recirculating swimming pool, a heat exchanging system or the like.

It is well known in the art to provide means for adding a measured amount of chemical to a recirculating liquid system in order to control algae growth, bacteria growth, scale deposition, corrosion or the like. In many chemical additive systems, a chemical storage tank is utilized to accumulate a chemical solution which is injected into the liquid system. It often happens that the storage tank is positioned at a level different from that of the liquid system receptacle, such that stoppage of the liquid delivery pump will often result in syphoning of the chemical-liquid solution into the liquid system or in the syphoning of liquids from the system into the chemical storage tank.

If the chemical storage tank is positioned at a level below the liquid system receptacle, the shut-off of pumps will allow syphoning from the receptacle into the storage tank thereby diluting the chemicals therein and overflowing the tank resulting in the loss of valuable chemicals and creating a mess which workmen must clean up. If the chemical storage tank is elevated above the liquid system receptacle, liquids therein will be syphoned into the receptacle thereby wasting valuable chemicals and perhaps creating such a concentration of chemicals as to defeat the purpose for which they were added. The prior art devices generally seek to avoid these syphoning effects by positioning electrically operated valves within the flow lines leading to the chemical tank and a sensing mechanism to motivate the valve operators when the liquid delivery pump is shut off.

It will be apparent that the prior art devices are characterized by a plurality of mechanisms which only collaterally relate to the operation of the chemical additive system and which are subject to malfunctioning, particularly since an electric power source is required. For example, the stoppage of a pump because of an electrical power failure would render the valves equally inoperable to close off the storage tank from the liquid system.

Another disadvantage of the prior art devices is that extremely complex mechanisms are required to add different chemicals to the liquid system, particularly when the concentration of each chemical must be increased or decreased independently of the remainder. In particular the prior art has been forced to utilize duplicate chemical additive systems, a series of single diaphragm pumps or a multiplex diaphragm pump to accomplish independent concentration adjustments of different chemicals.

Summary and objects of invention

It is an object of the instant invention to provide a chemical additive system which utilizes pressure liquids from the liquid delivery pump to dissolve solid chemicals and create a chemical-liquid solution which is delivered to the inlet side of the liquid delivery pump thereby adding the solution to the liquid system.

Another object of the instant invention is to provide a chemical additive system in which the cessation of operation of the liquid delivery pump automatically seals off the chemical storage tank thereby precluding the syphoning of the chemical-liquid solution from the storage tank without the requirement of an external power source.

A further object of the instant invention is to provide a pump-to-open valve in the flow line leading to the storage tank such that delivering pressurized liquid to the valve opens it allowing liquid flow therethrough with the valve automatically closing upon stoppage of the pump.

A further object of the instant invention is to provide a float operated valve in the flow line leading from the chemical storage tank to the inlet side of the pump to preclude the substantial syphoning of the chemical-liquid solution from the tank upon stoppage of the pump.

A still further object of the instant invention is to provide a float operated valve in the flow line leading from the chemical storage tank to the primer section of the pump such that air is prevented from being inserted into the pump during stoppage thereof to obviate cavitation of the pump during the next operating cycle.

Another object of the instant invention is to provide a chemical additive system which may be utilized to deliver two or more chemicals simultaneously and to vary the concentration of each chemical independently of the remainder.

Other objects and advantages of the instant invention reside in the combinations of elements, arrangements of parts and features of construction and operation, all as will be more fully pointed out hereinafter and disclosed in the accompanying drawing wherein there is shown a preferred embodiment of this inventive concept.

Description of drawing

In the drawing:

FIGURE 1 is a top plan view of a liquid system illustrated as a swimming pool;

FIGURE 2 is a side elevational view of the liquid delivery pump of the liquid system and the chemical additive apparatus of the instant invention, certain parts being broken away for clarity of illustrations;

FIGURE 3 is a longitudinal cross-sectional view of the pump-to-open valve of the instant invention; and FIGURE 4 is a vertical cross-sectional view of the chemical compartment taken substantially along line 4—4 of FIGURE 2 viewing in the direction of the arrows.

*Detailed description of preferred embodiment of invention*

Referring now to the drawing in detail, wherein like reference characters designate like elements throughout the several views thereof, there is indicated generally at 10 a liquid system having a receptacle 12 which is illustrated as a swimming pool positioned on a foundation 14 at one end of which is positioned a conventional diving board 16. A prime mover shown generally at 18 is operatively connected by a drive shaft 20 to a centrifugal pump shown generally at 22 drawing liquid through an inlet conduit 24 and a primer section shown generally at 26. When centrifugal pump 22 is operating, it delivers pressurized liquid through a pump outlet 28 and a conventional L 30 to an outlet conduit 32 from which the liquid exits into receptacle 12. Pump 22 is illustrated as a centrifugal pump since this type liquid delivery means has the characteristic of readily passing liquids therethrough when prime mover 18 is shut off. It should be apparent, however, that the chemical additive system of the instant invention is not limited thereto but is useful with any type of pump that may pass liquids when stopped.

A timer shown generally at 34 includes a clock 36 for periodically stopping and starting prime mover 18 and is connected therewith by a pair of electrical wires 38. As illustrated, therefore, liquid system 10 is of the periodically recirculating type with pump 22 intermittently delivering pressurized liquids to receptacle 12. Although the chemical additive system of the instant invention is most advantageous with periodically recirculating liquid system, it will become apparent that it is advantageously used with any type of liquid system that may shut down from time to time for one reason or another.

A chemical additive apparatus shown generally at 40 is positioned adjacent pump 22 and prime mover 18 and includes a chemical storage tank 42 closed by a conventional cap 44 with a first conduit shown generally at 46 connecting the outlet end of pump 22 to tank 42. A flow controller shown generally at 47 is positioned in first conduit 46 for regulating the amount of liquid flow into tank 42 with a pump-to-open valve shown generally at 48 closing first conduit 46 when pump 22 is quiescent and opening circuit 46 when pump 22 is actuated. A plurality of chemical compartments shown generally at 50 are positioned with respect to first conduit 46 such that the liquids passing therethrough may dissolve chemical particles positioned in compartments 50. A second fluid conduit shown generally at 54 provides communication between tank 42 and the inlet side of pump 22 and includes a float actuated valve shown generally at 56 for sealing off conduit 54 when pump 22 is turned off to minimize the syphoning effects on the chemical-liquid solution in tank 42.

First conduit 46 includes a nipple 57 connecting float controller 47 to the outlet side of pump 22, as may be seen in FIGURE 2 where nipple 57 is threaded into L 30, with a conduit segment 58 providing communication between the outlet of flow controller 47 and a conventional liquid-passing pressure-tight connection shown generally at 60 extending through the wall of storage tank 42. Another conduit segment 62 transmits liquid under pressure from connection 60 to pump-to-open valve 48 which includes a cylindrical casing 64 interiorly of which is an upwardly facing valve seat 63 receiving a relatively heavy but movable valve member 65.

A float control shown generally at 66 acts to regulate the liquid level within tank 42 by moving valve member 65 into sealing engagement with seat 63 when the liquid level rises above a predetermined point. Float control 66 includes an upstanding post 68 affixed to the upper end of casing 64 carrying a pivot pin 70 adjacent the upper end thereof on which a lever 72 is pivotally mounted. Lever 72 is of the first class and carries a float 74 spaced away from valve 48 with the other end of lever 72 being received in an elongate slot 75 formed by a valve actuating rod 76 as seen in FIGURE 3.

Rod 76 is affixed to valve member 65 and reciprocates through the top of casing 64 upon the transmittal of force thereto by either float 74 or the pump pressure within conduit 46. As shown in FIGURE 3, lever 72 normally resides intermediate the ends of slot 75 to allow valve member 65 to reciprocate freely in accordance with pressure exerted thereagainst by pump 22. Accordingly, when pump 22 is stopped valve member 65 falls into sealing engagement with seat 63 to preclude the syphoning of liquids from compartments 50 into conduit 46. Similarly, pumping against valve member 65 raises it to allow passage of liquids to compartments 50. It will be apparent that the free end of lever 72, slot 75 and rod 76 cooperate to form a lost motion connection between lever 72 and valve member 65.

When the liquid pumped into tank 42 through conduit 46 exceeds the liquids withdrawn through conduit 54, the liquid level within tank 42 rises thereby elevating float 74. During the initial elevation of float 74 the free end of lever 72 freely reciprocates within slot 75 of valve actuating rod 76. Further elevation of float 74 causes the free end of lever 72 to control the lower end of slot 75 thereby depressing actuating rod 76 and valve member 65 to close valve 48.

Providing fluid communication between pump-to-open valve 48 and chemical compartments 50 is another segment shown generally at 78 of first conduit 46. Segment 78 includes a flexible tube 80 connecting the outlet of valve casing 64 to a rigid standpipe 82 providing a plurality of apertures 84 adjacent compartments 50 for purposes more fully explained hereinafter. Standpipe 82 also provides a plurality of spaced slots 86, 87 with slidable sleeves 88, 89 positioned adjacent thereto such that sleeves 88, 89 may be selectively slidably moved on standpipe 82 to selectively cover or uncover either or both of slots 86, 87. It will be apparent that the uncovering of a portion of slot 86, 87 will bypass liquids from first conduit 46 directly into storage tank 42 without their passage through chemical compartments 50.

It will be apparent that an attendant may fill compartment 50 through closure 92 to position chemical particles 98 immediately under aperture 84, standpipe 82. When liquid is delivered through first conduit 46 it will exit through aperture 84 to impinge upon chemical particles 98 and dissolve a portion thereof with the chemical-liquid solution gravitating through apertures 94 to form a body of chemical-liquid solution 102 within storage tank 42.

As may be seen most clearly in FIGURE 4, compartment 50 includes an open topped receptacle 90 forming a slot 91 in the lower wall with a suitable closure 92 closing the open top such that an attendant may pour a bulk quantity of chemicals into compartment 50. A half cylindrical section 94 covers slot 91 and forms a plurality of openings 96 allowing the liquid to pass into tank 42.

As shown in FIGURE 2, each of compartments 50 is positioned immediately downstream from one of slots 86, 87 and sleeves 88, 89 which act as a liquid controller to vary the amount of liquid flowing into compartment 50 and thereby control the concentration of the liquid-chemical solution in tank 42. For purposes of illustration, different chemicals may be placed in each of compartments 50 with the desired flow rate through first compartment 50 varying from that through second compartment 50. The attendant may close cover slot 86 with sleeve 88 and partially open slot 87 by positioning sleeve 89 as shown. Accordingly, first compartment 50 will receive its share of the liquid with a substantial amount of the flowing liquid bypassing the second compartment such that only a predetermined quantity flows through it thereby varying the concentrations of the different chemicals in solution 102.

When the liquid-chemical solution exists from storage tank 42, it passes first through liquid level operated valve 56 which is illustrated as a float valve which closes conduit 54 as the liquid level 52 falls to a predetermined point. Valve 54 is provided with a casing 104 slidably carrying a valve member fixed to a reciprocal rod 106 actuated by a float assembly shown generally at 108. Float assembly 108 includes an upstanding post 110 carrying a pivot pin 112 on which is rotatably mounted a lever 114 carrying a float 116 supported by the upper surface of liquid body 102. It will be apparent that lowering of liquid level 52 will allow float 116 to fall thus depressing rod 106 and preventing flow into conduit 54.

When the liquid level within tank 42 is sufficiently above an inlet 118 formed by a casing 104, the valve member within valve 56 will be raised, allowing fluid to flow into a segment 120 of second conduit 54. Segment 120 is placed in fluid communication with a second segment 122 of second conduit 54 by a conventional liquid passing pressure type connection shown generally at 124. Segment 122 is in fluid communication with primer section 26 of pump 22 by a conventional elbow 126 and conduit segment 128.

It will be readily apparent that the interruption of operation of pump 22, as by the action of timer 34, a certain amount of the chemicals within tank 42 will drain by suction into receptacle 12. This amount will be kept at a minimum by the closing of liquid valve 56 such that the level of liquid 52 is always above valve inlet 118 to preclude the passage of air from tank 42 into primer section 26, thereby avoiding cavitation of centrifugal pump 22 when timer 34 actuates prime mover 18 on the next cycle.

Since valve 48 is normally closed and opened only by the delivering of pressurized liquids thereto, and since valve 56 is float operated, it will be seen that tank 42 will be sealed off from liquid system 10 shortly after the cessation of operation of prime mover 18. Accordingly, the amount of chemicals delivered to liquid system 10 after the shutdown of prime mover 18 will be minimal.

It is now seen that there is herein provided an improved chemical additive system having all of the objects and advantages of the instant invention, and others, including many advantages of great practical utility and commercial importance.

Since many embodiments may be made of the instant inventive concept, and since many modifications may be made in the embodiment hereinbefore shown and described, it is to be understood that the foregoing is to be interpreted as illustrative and not in a limiting sense.

We claim as our invention:

1. In a system for adding first and second chemicals to a liquid in which the chemicals are soluble, the combination of:
   (a) a tank for collecting solutions of the chemicals in the liquid;
   (b) first and second compartments respectively adapted to contain quantities of the first and second chemicals, each of said compartments having means for draining a solution of the corresponding chemical therefrom into said tank;
   (c) a liquid delivery conduit communicating with the interiors of said compartments for delivering the liquid thereto, said liquid delivery conduit extending through said first compartment into said second compartment;
   (d) means for selectively regulating the quantities of the liquid flowing into said first and second compartments from said liquid delivery conduit to vary the quantities of the first and second chemicals dissolved in the liquid in said first and second compartments; and
   (e) said regulating means including means for bypassing at least part of the liquid from said liquid delivery conduit at a bypass point downstream from said first compartment and upstream from said second compartment.

2. A chemical adding system as set forth in claim 1 wherein said bypassing means includes:
   (a) a bypass opening in said liquid delivery conduit at said bypass point; and
   (b) means for varying the flow of the liquid through said bypass opening.

3. A chemical adding system as defined in claim 2 wherein the means last mentioned includes a sleeve on and snugly fitting said liquid delivery conduit adjacent said bypass opening and slidable relative to said liquid delivery conduit to vary the extent to which said sleeve covers said bypass opening.

4. A system for adding first and second chemicals to a liquid in which they are soluble, including:
   (a) a receptacle for the liquid;
   (b) a tank located at a higher level than said receptacle for collecting solutions of the chemicals in the liquid;
   (c) a pump having an inlet and having an outlet communicating with said receptacle for delivering the liquid thereto;
   (d) first and second compartments in said tank and respectively adapted to contain the first and second chemicals, each of said compartments having means for draining a solution of the corresponding chemical therefrom into said tank;
   (e) a liquid delivery conduit communicating with said pump outlet and with the interiors of said compartments for delivering the liquid thereto;
   (f) means for regulating the amounts of the liquid delivered to said first and second compartments;
   (g) a liquid return conduit interconnecting said tank and said pump inlet to deliver solutions of the first and second chemicals emanating from said first and second compartments to said pump inlet;
   (h) a normally closed valve in said liquid delivery conduit, between said pump outlet and said compartments, and openable in response to pump outlet pressure in said liquid delivery conduit; and
   (i) a liquid-level-actuated valve in said liquid return conduit for closing same when the level in said tank falls to a predetermined minimum.

5. A chemical adding system according to claim 4 including liquid-level-actuated means for closing said valve in said liquid delivery conduit, against pump outlet pressure, when the liquid level in said tank rises to a predetermined maximum.

6. A chemical adding system as set forth in claim 5 including means providing a lost motion connection between said liquid-level-actuated means and said valve in said liquid delivery conduit.

7. A chemical adding system according to claim 6 wherein said valve in said liquid delivery conduit includes:
   (a) a valve casing;
   (b) an upwardly facing valve seat in said casing;
   (c) a valve member movable downwardly under the influence of gravity against said valve seat, and movable upwardly away from said valve seat by pump outlet pressure; and
   (d) said liquid-level-actuated means being connected to said valve member by said lost motion connection.

8. A chemical adding system as defined in claim 4 including flow control means in said liquid delivery conduit for regulating the rate of liquid flow therethrough.

9. In a chemical adding system for a liquid, the combination of:
   (a) a receptacle for the liquid;

(b) a tank adapted to receive a chemical solution and located at a level above said level;
(c) means for adding a chemical solution to said tank;
(d) a pump having an inlet and having an outlet communicating with said receptacle to deliver the liquid thereto;
(e) a liquid delivery conduit interconnecting said tank and said pump outlet;
(f) a liquid return conduit connecting said tank and said pump inlet;
(g) liquid actuated means in said liquid delivery conduit for limiting the liquid level in said tank to a predetermined maximum; and
(h) another liquid actuated means in said liquid return conduit for limiting the liquid level in said tank to a predetermined minimum.

References Cited

UNITED STATES PATENTS 2,136,372    11/1938    Burnett          23—272.5 X

M. CARY NELSON, *Primary Examiner.*

J. MILLER, *Assistant Examiner.*